US010757259B1

(12) United States Patent
Hua et al.

(10) Patent No.: US 10,757,259 B1
(45) Date of Patent: Aug. 25, 2020

(54) CUSTOM CALLING USING A MESSAGING SYSTEM

(71) Applicant: Facebook, Inc., Menlo Park, CA (US)

(72) Inventors: Li Hua, Bellevue, WA (US); Amit Kumar Dutta, Sammamish, WA (US); Vivek Garg, Seattle, WA (US); Joel Alexander Sharin, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 252 days.

(21) Appl. No.: 15/986,488

(22) Filed: May 22, 2018

(51) Int. Cl.
*H04M 3/51* (2006.01)
*H04M 3/523* (2006.01)
*H04L 12/58* (2006.01)
*H04L 29/08* (2006.01)
*H04M 3/42* (2006.01)
*G06F 40/205* (2020.01)

(52) U.S. Cl.
CPC ........ *H04M 3/5191* (2013.01); *G06F 40/205* (2020.01); *H04L 51/046* (2013.01); *H04L 51/16* (2013.01); *H04L 67/306* (2013.01); *H04M 3/42008* (2013.01); *H04M 3/5232* (2013.01)

(58) Field of Classification Search
None
See application file for complete search history.

(56) References Cited

U.S. PATENT DOCUMENTS

| 7,555,521 | B1* | 6/2009 | McLaughlin | H04L 51/04 379/88.17 |
| 9,160,858 | B2* | 10/2015 | Khouri | H04M 3/5232 |
| 2003/0185379 | A1* | 10/2003 | O'Connor | H04L 51/14 379/265.02 |
| 2010/0296646 | A1* | 11/2010 | Hemm | G06Q 10/107 379/265.02 |
| 2016/0196561 | A1* | 7/2016 | Iyer | G06Q 10/10 705/304 |
| 2017/0149971 | A1* | 5/2017 | Klemm | H04M 3/5191 |

* cited by examiner

*Primary Examiner* — Harry S Hong
(74) *Attorney, Agent, or Firm* — Fenwick & West LLP

(57) ABSTRACT

A business interfaces with a messaging server to establish routing rules that associate particular types of requests from users of clients with specific roles of agents in an agent pool. A user of a client engages in a canonical messaging thread with the business server via the messaging server. The messaging server receives a call request from the client. The messaging server uses the routing rules to identify the agent role to serve the user's request. The messaging server may exchange routing messages with the user in the canonical thread. The messaging server selects an agent from the agent pool to service the user's call-based communication request based on the profiles of the agents and the identified agent role. The messaging server establishes a call between the user and the selected agent. The agent and user may exchange messages on the canonical thread between the user and the business.

18 Claims, 5 Drawing Sheets

CUSTOM CALLING USING A MESSAGING SYSTEM

BACKGROUND

This disclosure relates generally to electronic messaging, and more particularly to integrating calling functionality with an electronic messaging system.

Use of text-based dedicated messaging applications for commercial transactions is becoming more commonplace. Dedicated messaging applications provide a rich feature set that may not be available using conventional email or other messaging technologies. Both the sender and receiver of the messages can be authenticated and delivery of the messages can be verified. In addition, the messages can include certain formatting and/or content features that are not supported by other messaging technologies. For these reasons, consumers use such applications as a convenient way to contact businesses. Businesses, in turn, use such applications to communicate directly with their customers and potential customers.

However, situations may arise in which text-based messaging may be inadequate or undesirable. In these situations a customer may need to speak to a live person representing the business. For example, a customer may need to speak to a live representative to resolve customer support or billing issues.

Businesses typically provide telephone numbers using which a customer can speak to a live representative, such as toll-free numbers. Establishing and maintaining these numbers can be burdensome and expensive. In addition, businesses need to develop and support interactive voice response (IVR) systems to receive placed calls and route the calls to the business representatives. IVR systems may have complex and confusing menu options which route calls to the wrong representatives and frustrate customers. Moreover, such IVR systems do not leverage the features and capabilities of dedicated messaging applications to enrich the customer support experience.

SUMMARY

The above and other issues are addressed by a messaging server that provides custom calling services to businesses. An administer associated with a business uses a business server to interface with the messaging server to register agents as being associated with the business. The agents have associated profiles specifying information about the agents, including roles performed by the agents. The agents collectively form an agent pool for the business.

The business server also interfaces with the messaging server to establish routing rules for the business. The routing rules associate particular types of requests from users of clients with specific roles of agents. The messaging server stores the routing rules.

A user of a client engages in a canonical messaging thread with the business server via the messaging server. The messaging server receives a call request from the client. The call request is an indication that the user of the client has requested a call-based communication with a representative of the business. In response to the call request, the messaging server accesses the routing rules for the business. The messaging server uses the routing rules to identify the agent role to serve the user's request. As part of this process, the messaging server may exchange routing messages with the user. The routing messages may occur on the canonical thread.

The messaging server selects an agent from the agent pool to service the user's call-based communication request. This selection is based on the profiles of the agents and the identified agent role. The messaging server establishes a call between the user and the selected agent. The agent and user then conduct the call. During the call, the agent and user may exchange messages on the canonical thread between the user and the business.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
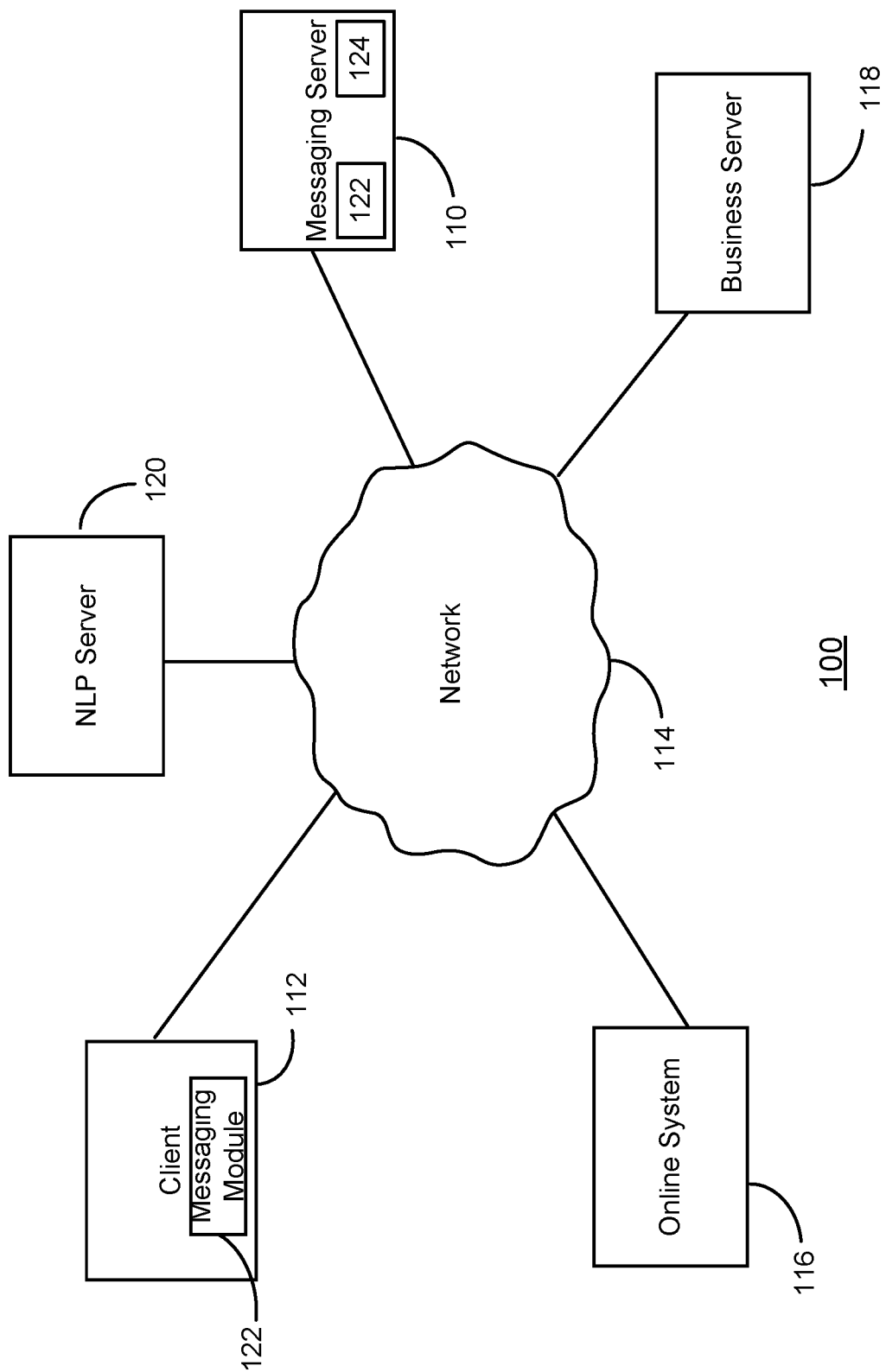
FIG. 1 is a high-level block diagram illustrating a system environment including an electronic messaging server.

FIG. 1 is a high-level block diagram illustrating a system environment 100 including an electronic messaging server 110. The environment 100 also includes a client 112 connected to the messaging server 110 via a network 114. An online system 116, business server 118, and agent pool 120 are also connected to the network 114. While FIG. 1 shows only a single client 112 and business server 118, embodiments of the environment 100 may have many such clients and business servers connected to the network 114. There may likewise be multiple messaging servers 110, online systems 116, and agent pools 120 connected to the network 114. Other components may also be connected to the network 114. The online system 116, messaging server 110, and business server 118 may be respectively implemented using one or more dedicated computers and/or a cloud computing platform.

A client 112 is a computing device that can transmit and/or receive data via the network 114. A user may use the client 112 device to perform functions such as exchanging messages using the messaging server 110, interacting with the online system 116, browsing websites on web servers on the network 114, conducting calls with agents in the agent pool 120, consuming digital content received via the network, and executing software applications. For example, the client 112 may be a smartphone or a tablet, notebook, or desktop computer. In addition, the client 112 may be an Internet—of—Things (IoT)—connected device such as a home appliance. The client 112 may include a camera and display device on which the user may capture and view digital content, and an audio interface including one or more microphones and speakers using which the user may capture and play audio content.

The client 112 may execute one or more applications ("apps") that extend the functionality of the client. The apps may include a web browser that allows the client device 112 to interact with websites provided by servers connected to the network 114. The apps may also include one or more dedicated apps for accessing the online system 116 and/or the messaging server 110. In one embodiment, the user downloads and installs apps on the client 112 for specific purposes, such as exchanging messages using the messaging server 110 and conducting calls with agents in the agent pool 120. Alternatively, the functionality of an app may be incorporated into an operating system of the client 112 or included in native functionality of the client.

The messaging module 122 illustrated within the client 112 in FIG. 1 represents an app for interacting with the messaging server 110 via the network 114. The messaging module 122 enables a user of the client 112 to exchange messages with users of other clients and with businesses operating business servers 118. In one embodiment, the messaging module 122 exchanges such messages with the messaging server 110. In addition, the messaging module 122 allows a user to interact with the messaging server 110 to conduct calls with agents in the agent pool 120.

The online system 116 supports interactions among users of the clients 112 and representatives of businesses. These interactions may include exchanging and viewing content, ecommerce transactions, messaging, and calling. The content provided by the online system 116 includes business pages associated with businesses. A page provides information about a business and may support other interactions such as allowing users to share information with the business.

In one embodiment, a business page includes a communication link with which a user can interact to initiate a communication with the associated business via the messaging server 110. The functionality may take the form of a code such as a clickable object or scannable image that contains a reference to the business's presence in the messaging server 110 and/or the business sever 118. When a user interacts with the communication link, the online system 116 interacts with the messaging module 122 of the user's client device and the messaging server 110 to exchange messaging information, such as identifiers of the user and business, allowing the user and business to communicate using the messaging server 110.

The communications can be text based and/or call-based. In a text-based communication the user exchanges text-based messages (which may include associated images or audio) with a representative of the business via the messaging server 110. In a call-based communication, the user exchanges real-time audio information with human representative of the business (e.g., a voice call). A business page may include one or more communication links for initiating specific types of communications, such as separate buttons for text and call-based communications. Alternatively, the business page may include a single communication link that, when selected, determines an appropriate type of communication by querying the user or using another technique.

In a further embodiment, the communication link may be located on the network 114 at a location outside of the online system 116. For example, the business may place the communication link on a website hosted by a web server connected to the network 114. In this example, a user of a client 110 can browse the website and interact with the communication link to initiate communications without having visited the online system 116.

The messaging server 110 interacts with the messaging modules 122 of the clients 112, the agent pool 120, and/or with the business servers 118 to support communications among users and business representatives. Depending upon the embodiment and type of communication, the messaging server 110 can route communications between the users and business representatives such that the communications pass through the messaging server 110, or can establish peer-to-peer communications that route the communications directly between the communicating parties.

In one embodiment, the messaging server 110 includes a message exchange module 122 that supports text based communications. The message exchange module 122 enables a user of a client 112 and one or more business representatives to exchange messages within a message thread. The message thread is formed of the chain of communication between the user and the business. That is, the thread contains the back-and-forth messages between the user and business.

In one embodiment, different representatives of the business can communicate with the user via the message thread. The identities of the representatives are hidden from the user to make all of the messages appear to come from the business rather than from the different representatives. This message thread is referred to as the "canonical" message thread between the user and the business because it represents the entire history of text-based messages between the user and the business exchanged via the message exchange module 122.

The messaging server 110 also includes a call module 124 that establishes calls between users of the clients 112 and business representatives. In one embodiment, the call module 124 receives an indication that a user of a client 112 has activated a communication link on a business page of the online system 116 or elsewhere to request a call-based communication with a representative of a particular business. In response, the call module 124 selects an agent from the agent pool 120 who is acting as a representative of that business, and establishes a call between the client 112 and the agent. In one embodiment, the call is conducted using the Voice over Internet Protocol (VoIP). The call can be a voice-only call, or can include both voice and video.

The business server 118 is operated by a business and used to conduct communications with users of clients 112 using the messaging server 110. The business server 118 is a computing device and may also function as a client. The business is typically a for-profit organization that uses the business server 118 to communicate with its customers. However, the business can also be another type of organization such as a non-profit organization, an educational organization, or a government organization. All of these types of organizations are considered "businesses" for purposes of this description. Moreover, a business is merely one example of a communicating entity within the environment of FIG. 1. The techniques described herein can be used to support communications with entities other than businesses.

In one embodiment, an administrator associated with the business server 118 interacts with the messaging server 110 to configure communications with the users of the clients 112. The configuring may involve, for example, identifying agents in the agent pool 120 who are serving as representatives of the business and specifying rules for how and when calls are routed to the agents. The administrator may also configure the page for the business maintained by the online system 116 and perform other tasks associated with the business.

The agent pool 120 represents the agents that can serve as representatives of businesses in interactions with users of the clients 112. The agent pool 120 may contain hundreds or thousands of agents. Each agent serves as a representative of one or more businesses. Agents may be available at different times. Thus, at a given time the agent pool 120 may contain subsets of agents that are available to represent different businesses. For example, a large business may have hundreds of agents at a time available in the agent pool 120 while a small business may have just one or a few agents in the pool.

In one embodiment, an agent is a human user using a client 112 like that described above. The agent uses functionality within the messaging module 122, or a different version of the messaging module, that allows the agent to establish a profile describing the agent's association with the business.

When a user of a client 112 selects a communication link to request a call with a representative of a particular business, the messaging server 110 selects a suitable agent from the pool 120 based on the agent profiles and establishes a call between the user and the agent. The user and agent can then communicate in real-time, by voice, to address the subject that led the user to request the call. In one embodiment, the messaging server 110 also provides the agent with access to the canonical thread between the user and the business for the duration of the call. The agent can therefore review textual information previously exchanged between the user and business, and can also communicate with the user via text while still on the call.

The messaging server 110 allows businesses to communicate with users, such as customers and potential customers, in a flexible and convenient manner. The messaging server 110 supports text and voice-based communications between users and agents, and allows agents to view and contribute to the canonical thread between the user as the business. Moreover, the messaging server 110 uses a distributed and decentralized agent pool 120, and reduces the administrative and technical difficulties a business might otherwise encounter while using representatives to interface with users. For example, the business does not need to establish toll free telephone numbers or manage a complex IVR system to support its customers.

The network 114 exchanges information among clients, servers, and systems connected to it. In one embodiment, the network 114 uses standard communications technologies and/or protocols. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 114 may be represented using any suitable format, such as hypertext markup language (HTML) or extensible markup language (XML). In some embodiments, all or some of the communication links of the network 114 may be encrypted using any suitable technique or techniques.

Figure 2:
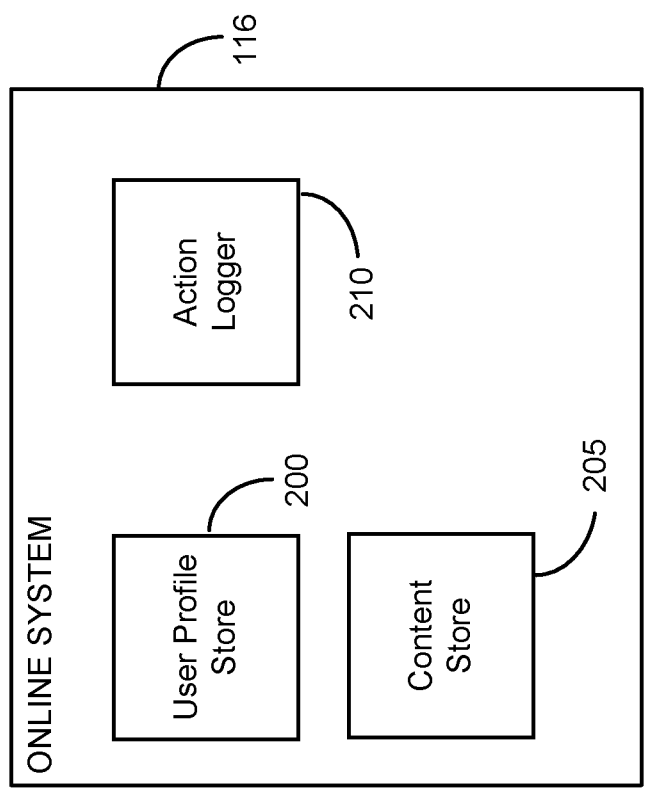
FIG. 2 is a block diagram of an architecture of the online system according to one embodiment.

FIG. 2 is a block diagram of an architecture of the online system 116 according to one embodiment. The online system 116 shown in FIG. 2 includes a user profile store 200, a content store 205, and an action logger module 210. In other embodiments, the online system 116 may include additional, fewer, or different components. Conventional components such as network interfaces, security functions, load balancers, failover servers, management and network operations consoles, and the like are not shown so as to not obscure the details of the system architecture.

Each user of the online system 116 is associated with a user profile, which is stored in the user profile store 200. A user profile includes declarative information about the user that was explicitly shared by the user and may also include profile information inferred by the online system 116. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action logger module 210.

While user profiles in the user profile store 200 are frequently associated with individuals, user profiles may also be stored for businesses. These profiles for businesses are the "business pages" referenced above. The business pages allow businesses to establish presences on the online system 116 for connecting and communicating with other online system users. A business may post information about itself to users of the online system 116 using one or more business pages. Other users of the online system 116 may connect to a business page to receive the information. As mentioned above, the business page may include a communication link allowing a user to communicate with a representative of the associated business via the messaging server 110.

The content store 205 stores objects that each represent various types of content. Examples of content represented by an object include a page post, a status update, a photograph, a video, a link, a shared content item, a gaming application achievement, a check-in event at a local business, or any other type of content. Online system users may create objects stored by the content store 205, such as status updates, photos tagged by users to be associated with other objects in the online system 116, events, groups or applications. In some embodiments, objects are received from third-party applications separate from the online system 116. In one embodiment, objects in the content store 205 represent single pieces of content, or content "items." Hence, online system users are encouraged to communicate with each other by posting text and content items of various types of media to the online system 116 through various communication channels. This increases the amount of interaction of users with each other and increases the frequency with which users interact within the online system 116.

The action logger module 210 receives communications about user actions internal to and/or external to the online system 116, populating an action log with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log.

Figure 3:
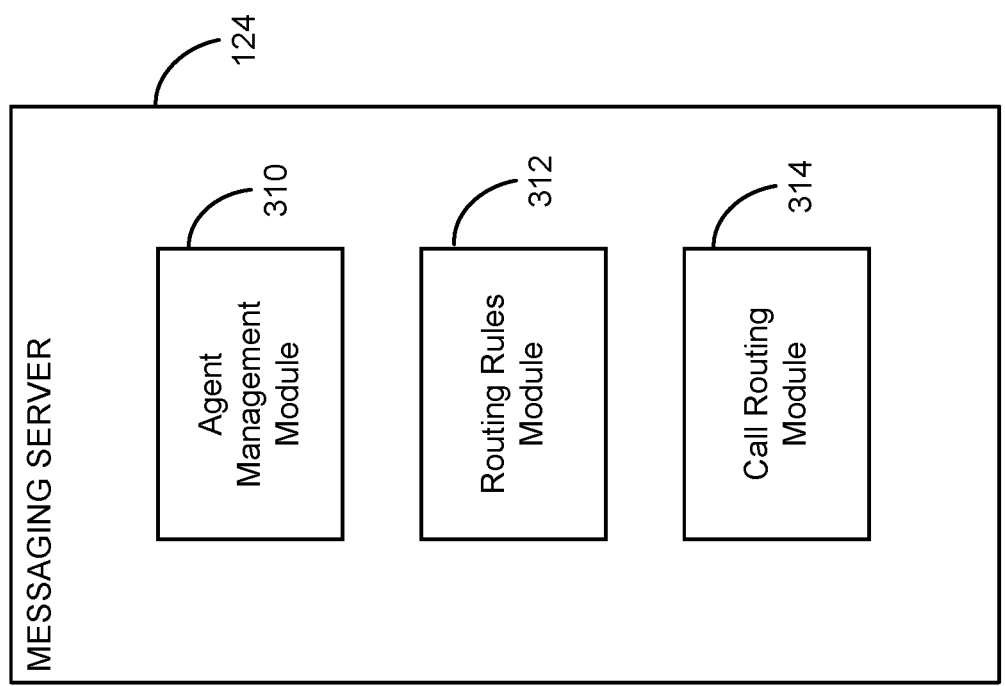
FIG. 3 is a block diagram illustrating a more detailed view of the call module of the messaging server according to one embodiment.

FIG. 3 is a block diagram illustrating a more detailed view of the call module 124 of the messaging server 110 according to one embodiment. The call module 124 shown in FIG. 3 includes multiple modules. In other embodiments, the call module 124 may include additional, fewer, or different modules. In addition, the functionality attributed to specific modules herein may be performed by other modules in other embodiments.

An agent management module 310 manages and stores information about the agents in the agent pool 120. In one embodiment, the agent management module 310 provides an Application Programming Interface (API) that allows administrators associated with businesses to register agents from the agent pool 120 as representatives of the administrators' respective businesses. In one embodiment, an administrator for a business uses the API to identify specific users of clients 112 as agents of the business. In response, the agent management module 310 creates special agent accounts for the identified users. An agent account for a user hides the personal information about the user and instead describes the user as an agent of the business. The agent management module 310 adds the agent accounts identified by a business administrator to the agent pool 120 and records that the accounts are associated with the given business.

Further, the agent management module 310 provides an API that allows agents to establish and edit profiles associated with the agent accounts. As mentioned above, an agent profile describes an agent's association with a business. To this end, an agent profile specifies information about the agent such as the agent's identity, the business or businesses represented by the agent, and availability information describing when the agent is available to interact with users on behalf of a business (e.g., time periods when the agent is on duty). The agent profile also includes role information specifying the agent's role with respect to the business. The role information describes an agent's customer service areas of expertise with respect to the business. For example, the profile for an agent can indicate that the agent serves in the roles of sales support, technical support, and/or billing support.

The agent profile also includes contact information for the agent describing how to contact the agent for text and/or call-based communications. The contact information may include a unique identifier assigned by the messaging server 110 that identifies the client 112 used by the agent and/or a network address that can be used to contact the agent's client to conduct a call. For example, the contact information may include a Session Initiation Protocol (SIP) Uniform Resource Identifier (URI) for establishing a VoIP call with the agent.

A routing rules module 312 establishes and stores rules for routing users of clients 112 to agents in the agent pool 120. In one embodiment, the routing rules module 312 provides an API that allows administrators associated with businesses to specify rules indicating how to route requests from users to agents associated with the respective businesses. The routing rules associate particular types of requests from users with specific roles of agents. For example, the routing rules may indicate that billing-related requests from users are routed to agents in the "billing support" role.

The routing rules module 312 may establish routing rules using a variety of techniques. In one embodiment, the routing rules module 312 provides an interface allowing the administrator of a business to create a decision tree for routing users to agents. The decision tree is a data structure having nodes and branches. Each internal node of the tree represents a test on an attribute and the branches represent the outcomes of the tests. The leaf nodes represent specific roles of agents to which users should be routed. Thus, a path through a decision tree eventually leads to a leaf node identifying a particular agent role such as sales support, technical support, or billing support.

In one embodiment, a business administrator interacts with the routing rules module 312 to establish a business call menu. The call menu describes interactions to conduct with a user to guide the user through the decision tree to the appropriate leaf node. In one embodiment, the business call menu describes structured prompts that are presented to the user in order to collect responses from the user that can be used to test node attributes. The structured prompts, and the user's responses to the prompts, may be exchanged using text messages within the user's canonical thread with the business as provided by the message exchange module 112.

In another embodiment, the business administrator interacts with the routing rules module 312 to establish parsing rules that describe how to parse unstructured text from a user to navigate through the decision tree. The parsing rules describe features that, if present in unstructured text, can be tested as node attributes in the decision tree. The parsing rules may be applied, for example, to text within a user's canonical thread with the business.

A call routing module 314 routes call requests from users of clients 112 to agents in the agent pool 120 based on the routing rules and the agent profiles. In one embodiment, the call routing module 314 is activated when a user selects the communication link to initiate a call-based communication with a business. Selection of the communication link activates a messaging bot (i.e., software code) to instantiate the call routing process. In one embodiment, the messaging bot gathers context information for the requested call-based communication, such as IDs of the user and business and information from the canonical thread, and passes the context information to the call routing module 314. The call routing module 314 uses the context information to identify the business associated with the link and accesses the routing rules for the business stored by the routing rules module 312. The call routing module 314 then applies the business's routing rules to the context and/or interacts with the user to identify the agent role to serve the user's request.

In an embodiment in which the routing rules describe a text-based business call menu, the call routing module 314 interacts with the message exchange module 122 to exchange routing messages with the user. The routing messages may include sending structured prompts from the call menu to the user as part of the user's canonical thread with the business and receiving the user's responses to the prompts. The call routing module 314 uses the responses to navigate through the decision tree until a leaf node is reached. The leaf node identifies the agent role that will serve the user's request.

In an embodiment in which the routing rules include parsing rules for parsing unstructured text, the call routing module 314 interacts with the message exchange module 122 to access the user's canonical thread. The call routing module 314 parses the text within the canonical thread to navigate through the decision tree to a leaf node identifying an agent role. The call routing module 314 may parse the entire canonical thread or a subset of the thread. For example, the call routing module may parse a portion of the thread delineated by time, such as the contents of the thread within the most recent day, hour, or other time period.

In addition, the call routing module 314 selects an agent from the agent pool to service the user's call-based communication request. This selection is based on the profiles of the agents associated with the business and the agent role identified by the call routing module 314. In one embodiment, once the agent role is identified, the call routing module 314 examines the profiles of the agents in the agent pool 120 associated with the business to identify the subset of agents having that agent role. The call routing module 314 then filters the subset of agents to exclude agents unavailable to service the user's call-based communication request. This filtering may involve examining the availability information in the profiles of the agents to identify agents that are available at the time of the user's call-based communication request and excluding agents that are unavailable. The call routing module 314 selects one of the available agents remaining in the subset, and uses the agent contact information to establish a call-based communication between the user and the selected agent. The call routing module 314 also interacts with the message exchange module 122 to grant the selected agent access to the canonical thread between the business and the user.

In some embodiments, the call routing module 314 maintains queues for the various agent roles of the business. Once the call routing module 314 determines the agent role associated with the call-based communication request from a user, the module assigns the user's request to a queue associated with the role. As agents having the appropriate role become available, the call routing module 314 establishes call-based communications between the agents and the users in the queue. For example, when an agent becomes available, call routing module 314 may use the agent contact information in the agent's profile and contact information associated with the user to place a VoIP call from the agent to the user. In addition, the call routing module 314 may determine a time when an agent will become available based on the size of the queue and/or the availability information of the agents having the specified role and schedule a time when it will place the call from an agent to the user.

Figure 4:
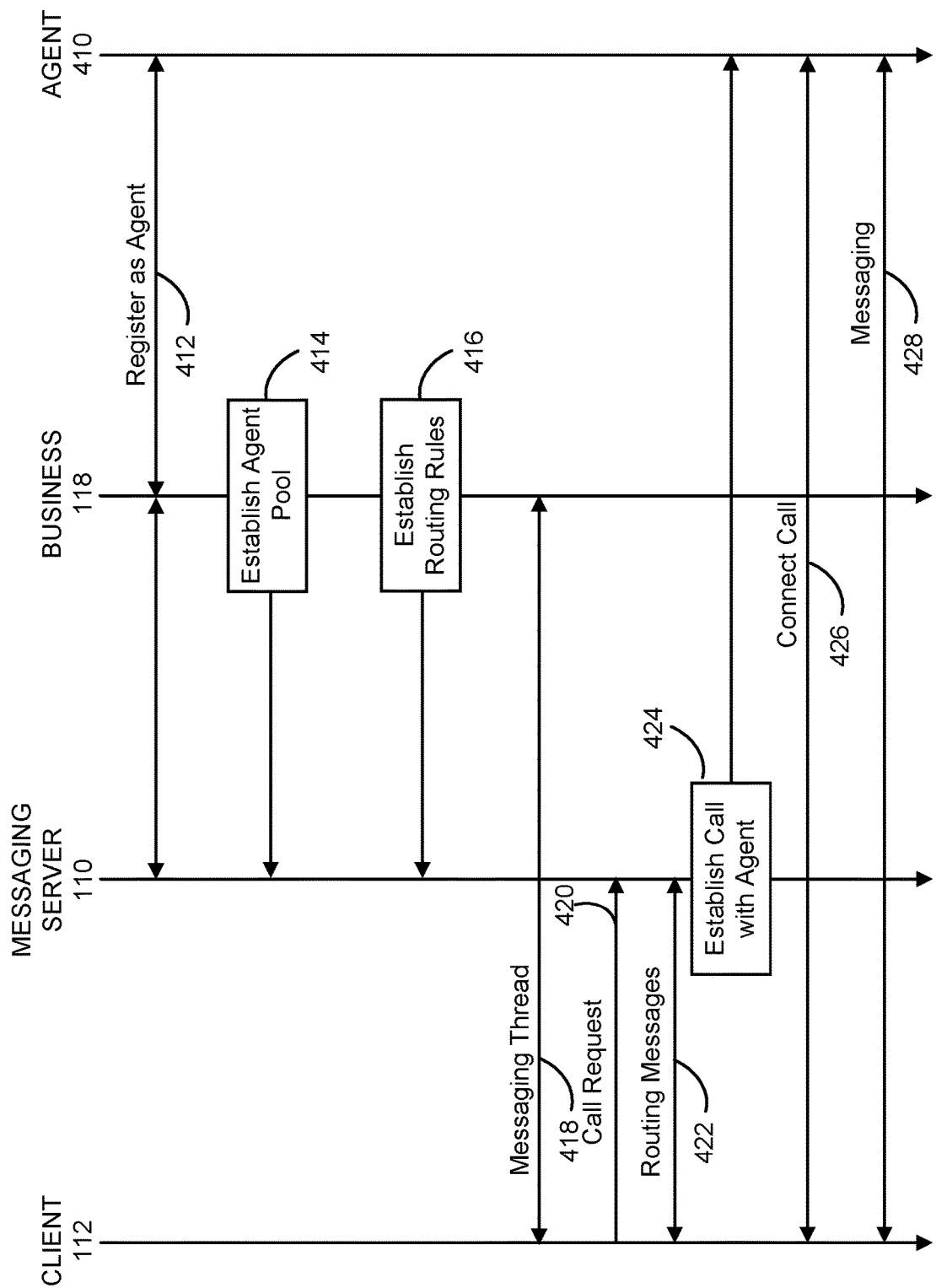
FIG. 4 is a flow diagram illustrating an example of interactions among the entities of FIG. 1 to support custom calling using a messaging system according to one embodiment.

FIG. 4 is a flow diagram illustrating an example of interactions among the entities of FIG. 1 to support custom calling using a messaging system according to one embodiment. The top of FIG. 4 illustrates a client 112 used by a user, the messaging server 110, the business server 118, and an agent 410 from the agent pool 120. An associated vertical line descends from each entity and represents the forward flow of time. Boxes on the vertical lines represent actions performed by the associated entity. Horizontal lines represent interactions between the entities associated with the vertical lines at which the horizontal lines terminate. The actions and interactions illustrated in FIG. 4 represent one embodiment. Other embodiments can have different actions and/or interactions, and the actions and/or interactions may occur in different orders. Additionally, in other embodiments, some actions may be performed in different entities, and the interactions may involve other entities.

The example of FIG. 4 begins with the business server 118 (e.g., an administrator associated with the business and using the business server) registering 112 the agent 410 as an agent of the business. The agent 410 may interface with the messaging server 110 and/or the online system 116 to establish a profile specifying information about the agent. The business server 118 may then interact with the messaging server 110 to register the agent as being associated with the business. This process may be repeated for multiple agents. The end result is that the business server establishes 414 an agent pool 120 for the business, and information describing the agent pool is stored by the messaging server 110. Each agent in the agent pool for the business includes a profile describing the agent's association with the business and information about the agent, including the agent's role with respect to the business.

The business server 118 interfaces with the messaging server 110 to establish 416 routing rules for the business. The routing rules associate particular types of requests from users of clients 112 with specific roles of agents. The messaging server 110 stores the routing rules.

A user of the client 112 engages 418 in a canonical messaging thread with the business server 118 via the messaging server 110. This messaging thread may include messages from the client 112 to the business server 118 and/or messages from the business server to the client. While FIG. 4 illustrates the messaging thread occurring after the agent pool and routing rules are established, the messages in the thread may be exchanged at other times.

The messaging server 110 receives 420 a call request from the client 112. The call request is an indication that the user of the client 112 has selected a communication link on a business page of the online system 116 or elsewhere to request a call-based communication with a representative of the business. In one embodiment, selection of the communication link activates a messaging bot that gathers context information and passes the context information to the messaging server 110. In response to the call request, the messaging server 110 accesses the routing rules for the business. The messaging server 110 uses the routing rules to identify the agent role to serve the user's request. As part of this process, the messaging server 110 may exchange 422 routing messages with the user. The routing messages may occur on the canonical thread.

The messaging server 410 selects an agent from the agent pool 120 to service the user's call-based communication request. This selection is based on the profiles of the agents and the identified agent role. Assume for purposes of this example that the messaging server 110 selects agent 410 to service the request. The messaging server 110 therefore establishes 424 a call between the user and the agent 410. For example, the messaging server 110 may use contact information for the agent to place a VoIP call between the agent 410 and the user. The agent 410 and user then conduct 426 the call. During the call, the agent 410 and user may exchange 428 messages on the canonical thread between the user and the business.

Figure 5:
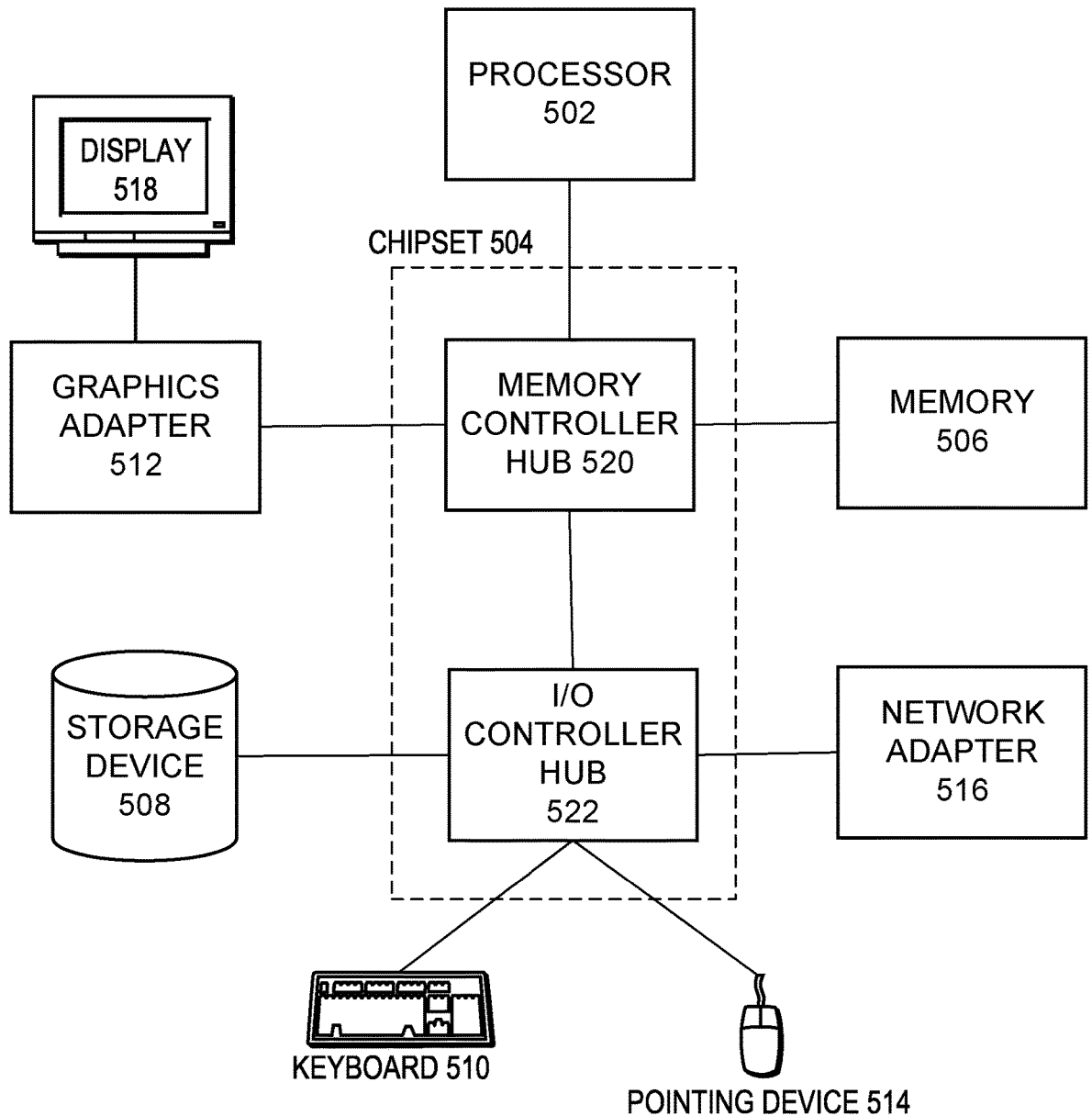
FIG. 5 is a high-level block diagram illustrating physical components of a computer used as part or all of one or more of the entities described herein in one embodiment.

FIG. 5 is a high-level block diagram illustrating physical components of a computer 500 used as part or all of one or more of the entities described herein in one embodiment. For example, instances of the illustrated computer 500 may be used as the messaging server 110. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a request from a client for a call-based communication with a business;
   accessing routing rules associated with the business, the routing rules associating requests for call-based communications with the business with specific roles of agents associated with the business;
   selecting an agent associated with the business responsive to the routing rules and a text-based message thread exchanged between the client and the business, the text-based message thread being a canonical message thread representing a history of text-based messages between the client and the business; and
   establishing the call-based communication between the client and the selected agent.

2. The method of claim 1, further comprising:
   establishing an agent pool including a plurality of agents associated with the business, agents in the agent pool having associated profiles including role information specifying the agents' roles with respect to the business;
   wherein the agent is selected from among the plurality of agents in the agent pool responsive in part to the agent's associated profile.

3. The method of claim 1, wherein the routing rules describe a decision tree for identifying agent roles for call-based communication requests and selecting the agent comprises:
   exchanging routing messages with the client via the text-based message thread, the routing messages identifying a path through the decision tree to identify an agent role for the call-based communication request received from the client;
   wherein selecting the agent comprises selecting an agent having the identified role.

4. The method of claim 1, wherein the routing rules describes parsing rules for identifying agent roles for call-based communication requests and selecting the agent comprises:
   parsing the text-based message thread according to the parsing rules to identify an agent role for the call-based communication request received from the client.

5. The method of claim 4, wherein parsing the text-based message thread comprises parsing a subset of the text-based message thread, the subset delineated by a time period in which messages in the thread were exchanged.

6. The method of claim 1, further comprising:
   providing the selected agent with access to the text-based message thread exchanged between the client and the business;
   receiving a text-based message from the selected agent; and sending the text-based message from the selected agent to the client, wherein the sent text-based message appears to the client as being from the business and hides an identity of the agent.

7. A system comprising:
a computer processor for executing computer program instructions; and
a non-transitory computer-readable medium storing computer program instructions executable by the processor to perform operations comprising:
receiving a request from a client for a call-based communication with a business;
accessing routing rules associated with the business, the routing rules associating requests for call-based communications with the business with specific roles of agents associated with the business;
selecting an agent associated with the business responsive to the routing rules and a text-based message thread exchanged between the client and the business, the text-based message thread being a canonical message thread representing a history of text-based messages between the client and the business; and
establishing the call-based communication between the client and the selected agent.

8. The system of claim 7, the operations further comprising:
establishing an agent pool including a plurality of agents associated with the business, agents in the agent pool having associated profiles including role information specifying the agents' roles with respect to the business;
wherein the agent is selected from among the plurality of agents in the agent pool responsive in part to the agent's associated profile.

9. The system of claim 7, wherein the routing rules describe a decision tree for identifying agent roles for call-based communication requests and selecting the agent comprises:
exchanging routing messages with the client via the text-based message thread, the routing messages identifying a path through the decision tree to identify an agent role for the call-based communication request received from the client;
wherein selecting the agent comprises selecting an agent having the identified role.

10. The system of claim 7, wherein the routing rules describes parsing rules for identifying agent roles for call-based communication requests and selecting the agent comprises:
parsing the text-based message thread according to the parsing rules to identify an agent role for the call-based communication request received from the client.

11. The system of claim 10, wherein parsing the text-based message thread comprises parsing a subset of the text-based message thread, the subset delineated by a time period in which messages in the thread were exchanged.

12. The system of claim 7, the operations further comprising:
providing the selected agent with access to the text-based message thread exchanged between the client and the business;
receiving a text-based message from the selected agent; and
sending the text-based message from the selected agent to the client, wherein the sent text-based message appears to the client as being from the business and hides an identity of the agent.

13. A non-transitory computer-readable storage medium storing computer program instructions executable by a processor to perform operations comprising:
receiving a request from a client for a call-based communication with a business;
accessing routing rules associated with the business, the routing rules associating requests for call-based communications with the business with specific roles of agents associated with the business;
selecting an agent associated with the business responsive to the routing rules and a text-based message thread exchanged between the client and the business, the text-based message thread being a canonical message thread representing a history of text-based messages between the client and the business; and
establishing the call-based communication between the client and the selected agent.

14. The non-transitory computer-readable storage medium of claim 13, the operations further comprising:
establishing an agent pool including a plurality of agents associated with the business, agents in the agent pool having associated profiles including role information specifying the agents' roles with respect to the business;
wherein the agent is selected from among the plurality of agents in the agent pool responsive in part to the agent's associated profile.

15. The non-transitory computer-readable storage medium of claim 13, wherein the routing rules describe a decision tree for identifying agent roles for call-based communication requests and selecting the agent comprises:
exchanging routing messages with the client via the text-based message thread, the routing messages identifying a path through the decision tree to identify an agent role for the call-based communication request received from the client;
wherein selecting the agent comprises selecting an agent having the identified role.

16. The non-transitory computer-readable storage medium of claim 13, the operations further comprising:
providing the selected agent with access to the text-based message thread exchanged between the client and the business;
receiving a text-based message from the selected agent; and
sending the text-based message from the selected agent to the client, wherein the sent text-based message appears to the client as being from the business and hides an identity of the agent.

17. The non-transitory computer-readable storage medium of claim 13, wherein the routing rules describes parsing rules for identifying agent roles for call-based communication requests and selecting the agent comprises:
parsing the text-based message thread according to the parsing rules to identify an agent role for the call-based communication request received from the client.

18. The non-transitory computer-readable storage medium of claim 17, wherein parsing the text-based message thread comprises parsing a subset of the text-based message thread, the subset delineated by a time period in which messages in the thread were exchanged.

* * * * *